US009726967B1

(12) United States Patent
Harrison et al.

(10) Patent No.: US 9,726,967 B1
(45) Date of Patent: Aug. 8, 2017

(54) DISPLAY MEDIA AND EXTENSIONS TO DISPLAY MEDIA

(75) Inventors: Beverly L. Harrison, Palo Alto, CA (US); Edward Dietz Crump, Santa Cruz, CA (US); William Thomas Weatherford, San Mateo, CA (US); Juli A. Satoh, San Jose, CA (US); Navid Poulad, Sunnyvale, CA (US); Robert A. Yuan, Belmont, CA (US); Jon L. Lindskog, Los Gatos, CA (US); Christopher D. Coley, Morgan Hill, CA (US)

(73) Assignee: Amazon Technologies, Inc., Seattle, WA (US)

(*) Notice: Subject to any disclaimer, the term of this patent is extended or adjusted under 35 U.S.C. 154(b) by 956 days.

(21) Appl. No.: 13/601,410

(22) Filed: Aug. 31, 2012

(51) Int. Cl.
*G03B 21/56* (2006.01)
*G02B 5/08* (2006.01)

(52) U.S. Cl.
CPC .......... *G03B 21/56* (2013.01); *G02B 5/0816* (2013.01)

(58) Field of Classification Search
CPC ........ G03B 21/56–21/64; G03B 25/00–25/02; G02B 27/01–27/0189; G02B 5/20–5/289
USPC ........ 359/350, 358–361, 443–459, 478–479, 359/515–553, 838–884, 893
See application file for complete search history.

(56) References Cited

U.S. PATENT DOCUMENTS

| | | | | |
|---|---|---|---|---|
| 8,964,292 B1 * | 2/2015 | Marason | G03B 21/60 | 359/449 |
| 2006/0138225 A1 * | 6/2006 | Richley | G06K 7/10009 | 235/385 |
| 2008/0180797 A1 * | 7/2008 | May | G03B 21/60 | 359/443 |
| 2009/0027791 A1 * | 1/2009 | Yue | 359/875 | |
| 2009/0040472 A1 * | 2/2009 | Wakita | G02B 7/28 | 353/69 |
| 2010/0195201 A1 * | 8/2010 | Minoura | G02B 5/045 | 359/452 |
| 2012/0223885 A1 | 9/2012 | Perez | | |
| 2012/0236038 A1 * | 9/2012 | Cudak | G06T 3/40 | 345/667 |
| 2012/0293557 A1 * | 11/2012 | Hsu | G06F 3/0425 | 345/672 |
| 2013/0222236 A1 * | 8/2013 | Gardenfors | G06F 3/03 | 345/156 |

(Continued)

FOREIGN PATENT DOCUMENTS

WO WO2011088053 7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

*Primary Examiner* — Bumsuk Won
*Assistant Examiner* — Jeffrey Madonna
(74) *Attorney, Agent, or Firm* — Lee & Hayes, PLLC

(57) ABSTRACT

Display media configured to receive projected content are described herein. In some instances, a display medium may be a non-powered object that a user may hold and move in different ways through a room or other environment. The display medium may be formed to fit into the user's hand and include elements that provide information to accurately project an image onto the display medium or to perform other actions.

17 Claims, 6 Drawing Sheets

300
304
302(1)
302(4)
3B
3B
308(1)
308(2)
306
302(2)
308(3)
308(4)
302(3)

(56) References Cited

U.S. PATENT DOCUMENTS

2014/0016107 A1* 1/2014 Coulson ............... G02B 27/106
353/94
2014/0043516 A1* 2/2014 Baker ........................ 348/333.1

* cited by examiner

DISPLAY MEDIA AND EXTENSIONS TO DISPLAY MEDIA

BACKGROUND

A large and growing population of people is enjoying entertainment through consumption of digital content items, such as music, movies, images, books, and so on. Many people today consume digital content through a wide variety of electronic devices. Among these electronic devices are cellular telephones, personal digital assistants (PDAs), electronic book readers, portable media players, tablets, netbooks, and the like. As more content is made available in digital form, people continue to consume more and more of this content. In addition, this population expects digital content to become more and more accessible and ubiquitous.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
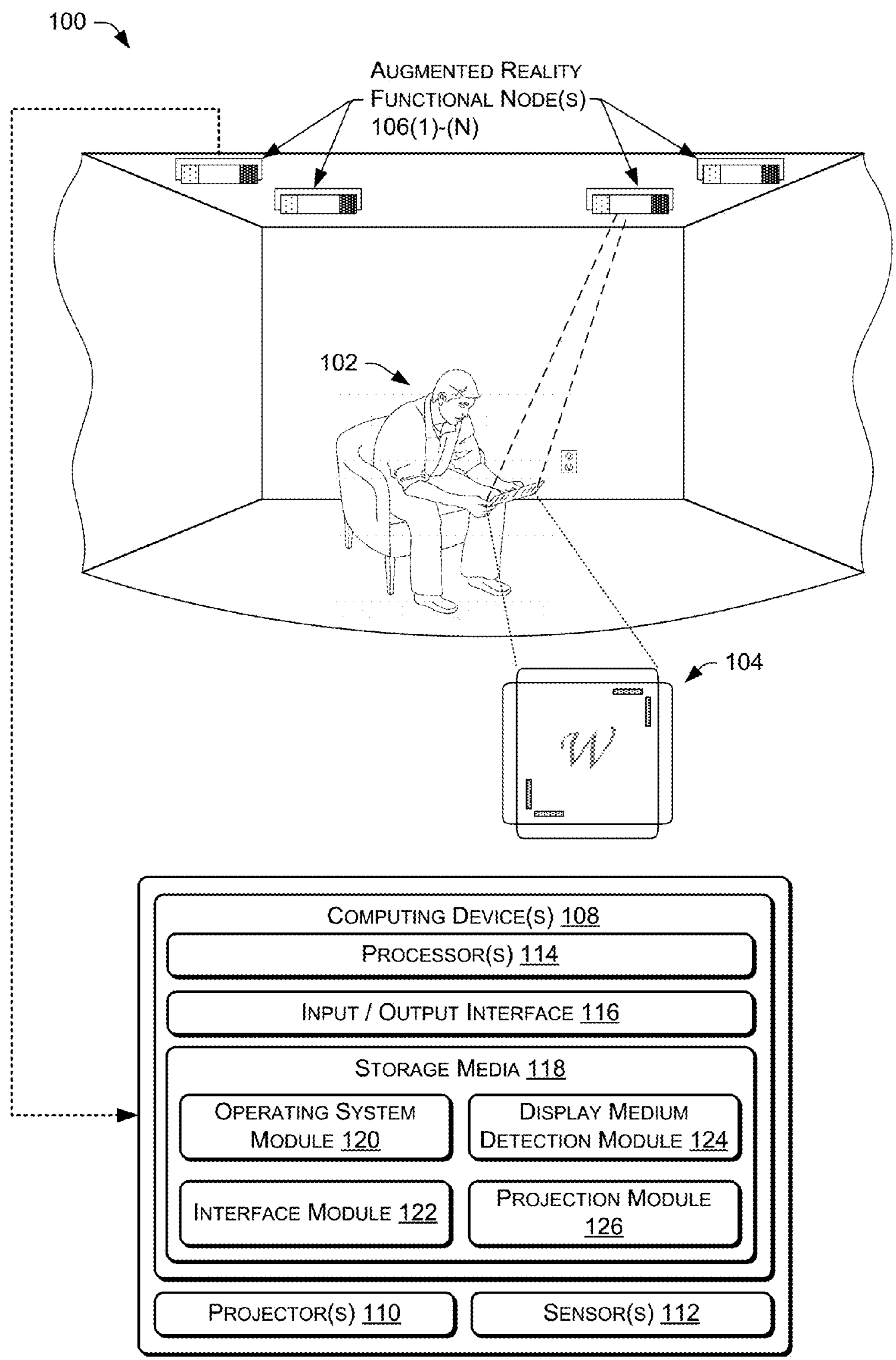
FIG. 1 illustrates an example environment that includes an augmented reality functional node (ARFN) configured to project content onto a display medium.

This disclosure describes various display media upon which content may be projected and extensions for display media. In certain embodiments, a display medium may be a non-powered object that a user may hold and move in different ways through a room or other environment. This may allow the user to read an electronic book, watch a video, view images, or otherwise consume any other form of projected content on the display medium. The display medium may be formed to fit into the user's hand and include elements that provide information to accurately project an image onto the display medium or to perform other actions.

In some instances, the display medium includes a polygonal, circular, or elliptical body upon which content may be projected. The display medium may also include a handle removably attached to the body and configured to a shape of a user's hand, such as a finger of the user. Alternatively, or additionally, the display medium may be weighted heavier on one end than another to provide a more comfortable feel to the user when holding the display medium. In some instances, the display medium may also include a stand removably attached to the body to enable the display medium to be placed in a particular orientation.

The display medium may also include a marker, such as an infrared reflector or an image having a watermark embedded therein, arranged on a surface of the display medium. In some instances, the marker is positioned in a predetermined pattern and/or at a predetermined location on the display medium. When an augmented reality functional node obtains an image of the display medium in order to identify a surface on which to project content, the location and/or pattern of the marker may be utilized to determine an orientation or position of the display medium. Further, in some instances the marker may include encoded information, such as information describing a shape or size of the display medium, information for authenticating a user, information for controlling access to content, and so on.

In some instances, the display media described herein may enhance a user's interaction with the display media. For example, by including handles or formed edges, the display media may allow a user to easily hold the display media and move around in an environment while content is projected onto the display media. Further, the display media may enable content to be accurately projected onto the display media. For example, by including a marker on a surface of the display media, an augmented reality functional node may utilize information encoded or otherwise provided by a location/pattern of the marker to accurately determine a position or orientation of the display media.

This brief introduction is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

EXAMPLE ENVIRONMENT

FIG. 1 illustrates an example environment 100 in which a user 102 consumes content that is projected onto a display medium 104 by one or more augmented reality functional nodes (ARFNs) 106(1), . . . , 106(N) (collectively referred to as "the ARFN 106" in some instances). It is to be appreciated that the techniques described herein may be performed by a single ARFN, by a collection of any number of ARFNs, or by any other devices or combinations of devices. The projected content may include electronic books, videos, images, interactive menus, or any other sort of visual and/or audible content.

In the example environment 100, the ARFN 106 is located in a ceiling of a room. However, the ARFN 106 may be located in other locations, such as on a table next to the user 102, in a wall, on a floor, and so on. Further, in some instances the ARFN 106 may be located in and/or integral with an object, such as a lamp, chair, and so on. Moreover, although the ARFN 106 is orientated in the environment 100 to project content from an elevated position with respect to the user 102, the ARFN 106 may alternatively, or additionally, be orientated differently, such as below the user 102 (e.g., rear projection).

The display medium 104 may generally comprise a passive and/or non-powered medium onto which content is projected. In some instances, the display medium 104 comprises a movable and/or handheld object. The display medium 104 may be formed to fit into the user's hand and include elements that provide information to accurately project an image onto the display medium 104 or to perform other actions, as discussed in further detail below. Further, in some instances the display medium 104 may comprise an object that is placed in the environment 100 that is not necessarily held by the user 102, such as a placemat located on a table or elsewhere. A few of the structural characteristics of the display medium 104 include:

- Shape and/or size. The shape may include a polygon (e.g., triangle, quadrilateral, pentagon, hexagon, etc.), circle, ellipse, or other shapes. In some instances, the shape includes a three-dimensional shape, such as a sphere, cube, cone, pyramid, cylinder, and so on. In one example, the display medium 104 comprises a dish-like shape with one or more upturned edges. Further, in one example the display medium 104 includes a non-uniform surface (e.g., non-flat).
- Texture and/or coating. The texture may include a smooth, rough, chalk-like, paper-like, or other texture. The coating may comprise paint or any other substance that may be applied to a surface of the display medium 104. In some instances, the display medium 104 includes a stamped surface.
- Material of which the display medium 104 is made. The material may be dishwasher safe and/or biodegradable. As such, in some instances the display medium 104 may be disposable. Further, in some instances the material may be transparent or semi-transparent, allowing content to be projected on one side and viewed on the other (e.g., rear projection).
- Weighting. The display medium 104 may be weighted to a predetermined amount to give the display medium 104 a particular feel when it is being used. In one example, the display medium 104 is weighted heavier on one side/edge than another. This may allow the display medium 104 to provide a comfortable feel when holding the display medium 104 on the heavier side/edge, similar to that of a book.
- Marker(s). The marker may comprise an infrared element (e.g., reflector) and/or an image having a watermark (e.g., digital watermark) embedded therein. The image may generally comprise a picture and/or text having information (e.g., the digital water mark) embedded therein through digital watermarking techniques. As discussed below, the embedded information (e.g., the digital watermark) may comprise any type of information, such as information associated with the display medium 104. The marker may be disposed on an outer surface of the display medium 104 and/or embedded in the display medium 104. The marker may be visible or invisible to a user and/or may give the display medium 104 a slight coloring.
- Formed edge(s). In some instances, one or more edges of the display medium 104 are upturned and/or downturned (e.g., similar to a paper plate). Here, at least one edge may be upturned more than another edge of the display medium 104 to provide a more suitable holding location in a hand. Further, in some instances one or more edges of the display medium 104 may be formed to a user's hand/fingers. In one example, the edge is formed to a grip of the user (e.g., as if the edge was molded to the user's grip).
- Handle. The handle may be integral with the display medium 104 or removably attached to the display medium 104. As such, in some instances the handle is interchangeable to provide customization of the display medium 104. As similarly discussed above, the handle may be formed to a user's hand/fingers. Further, in some instances the handle may enable specific functionality, such as game control (e.g., a handle optimized for gaming including buttons, joysticks, etc.), content control (e.g., handle including buttons similar to a television remote), and so on. The handle may be disposed on an edge of the display medium 104.
- Stand. The stand may be integral with the display medium 104 or removably attached to the display medium 104. As such, in some instances the stand is interchangeable to provide customization of the display medium 104. The stand may allow the display medium 104 to be placed in an upright, lying down, or other orientation. That is, the stand may generally support the display medium 104 when placed on a surface. In one example, the stand comprises sections that are folded to form a triangle or other shape that allows the display medium 104 to be placed upright. Further, in one example the stand allows the display medium to rotate.

In some instances, the display medium 104 includes sides/surfaces/areas that have different characteristics. The different characteristics may, for example, allow different types of content to be optimally received on the display medium 104. For example, the display medium 104 may include a front side that has characteristics that are optimal from receiving media content (e.g., movies, games, etc.) and a back side that has characteristics that are optimal form receiving textual content (e.g., books, newspapers, etc.). Here, the display medium 104 may include different markers to indicate to the ARFN 106 which side of the board is facing toward the ARFN 106.

As illustrated in FIG. 1, the ARFN node 106 comprises a computing device(s) 108, a projector(s) 110, and a sensor(s) 112 (e.g., camera, ranging system, etc.). Some or the all of the computing device(s) 108 may reside within a housing of the ARFN node 106 or may reside at another location that is operatively connected to the ARFN node 106. The computing device(s) 108 comprises a processor(s) 114, an input/output interface 116, and storage media 118. The processor(s) 114 may be configured to execute instructions that may be stored in the storage media 118 or in other storage media accessible to the processor(s) 114.

The input/output interface 116, meanwhile, may be configured to couple the computing device(s) 108 to other components of the ARFN node 106, such as the projector(s) 110, the sensor(s) 112, other ARFN nodes (such as in other environments or in the environment 100), other computing devices, network communication devices (such as modems, routers, and wireless transmitters), and so forth. The coupling between the computing device(s) 108 and other devices may be via wire, fiber optic cable, wireless connection, or the like. The sensor(s) 112 may include, in various embodiments, cameras (motion and/or still cameras), audio sensors such as microphones, ultrasound transducers, heat sensors, motion detectors (including infrared imaging devices), depth sensing cameras, weight sensors, touch sensors, tactile output devices, olfactory sensors, temperature sensors, humidity sensors, and pressure sensors. Other sensor types may be utilized without departing from the scope of the present disclosure.

The storage media 118, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory, or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the computing device(s) 108. The storage media 118 may reside within a housing of the ARFN 106, on one or more storage devices accessible on a local network, on cloud storage accessible via a wide area network, or in any other accessible location. As defined herein, CRSM does not include communication media, such as modulated data signals and carrier waves.

The storage media 118 may store several modules, such as instructions, data stores, and so forth that are configured to execute on the processor(s) 114. For instance, the storage media 118 may store an operating system module 120, an interface module 122, a display medium detection module 124, and a projection module 126. The storage media 118 may also include other modules, which may be configured to implement various different functionality of the ARFN 106.

The operating system module 120 may be configured to manage hardware and services within and coupled to the computing device(s) 108 for the benefit of other modules. The interface module 122, meanwhile, may be configured to receive and interpret commands received from users within the environment 100. For instance, the interface module 122 may analyze and parse images captured by one or more cameras of the sensor(s) 112 to identify users within the environment 100 and to identify gestures made by users within the environment 100, such as gesture commands to project display content. In other instances, the interface module 122 identifies commands audibly issued by users within the environment and captured by one or more microphones of the sensor(s) 112. In still other instances, the interface module 122 allows users to interface and interact with the ARFN node 106 in any way, such as via physical controls, and the like.

The display medium detection module 124 may detect the display medium 104 within the environment 100 and/or identify information about the display medium 104. For example, the module 124 may analyze information (e.g., an image) provided by the sensor(s) 112 (e.g., depth sensing camera) about the environment 100 and identify the display medium 104 within the environment 100. When, for example, the display medium 104 includes a marker (e.g., image having a digital watermark embedded therein or an infrared reflector), the module 124 may also determine a characteristic, position, or orientation of the display medium 104 from the marker. For example, if the marker is positioned in a predetermined pattern or at a predetermined location on the display medium 104 that is known by the ARFN 106, the ARFN 106 may determine, or adjust a previously determined, position or orientation of the display medium 104. Further, the ARFN 106 may obtain information embedded into the marker of the display medium 104. The embedded information (e.g., digital watermark) may include, for example:

- Information describing structural characteristics of the display medium 104, such as a shape, size, texture, coating, and/or material of the display medium 104. In some instances, this information may indicate that a particular side/surface/area of the display medium 104 has particular characteristics. The information may be used by the ARFN 106 to determine characteristics of the display medium 104 for use in projecting content, tracking the display medium 104, or other purposes.
- Information for identifying the display medium 104, such as a serial number, model number, stock-keeping unit (SKU) number, or version number (e.g., 3$^{rd}$ generation). In some instances, this information may be used by the ARFN 106 to "look-up" characteristics of the display medium 104 that are stored locally at the ARFN 106 or remotely.
- Information for authenticating a user. In some instances, this information may be used by the ARFN 106 to authenticate (e.g., login) a particular user that is associated with the display medium 104. If, for example, the particular user is attempting to use the display medium 104, then the ARFN 106 would authenticate the particular user based on the information from the display medium 104. Upon authenticating, the particular user may use the ARFN 106 and/or have access to content that is associated with the particular user (e.g., magazine subscriptions, songs acquired by the particular user, etc.). However, if a different user is attempting to use the display medium 104, then the ARFN 106 would not authenticate the user. Here, the other user may be restricted from using the ARFN 106 with the display medium 104 and/or from accessing particular content.
- Information for accessing particular content. This information may instruct the ARFN 106 to project the particular content (e.g., particular movie), may include a link (e.g., URL) to access the particular content, or may indicate content that can be accessed when a user utilizes that particular display medium 104.
- Media content, such as videos, music, pictures, etc. For example, the display medium 104 may be associated with a particular movie or songs from a particular artist. In some instances, the content may be output (e.g., projected, played, etc.) when a marker (e.g., digital watermark) is detected on the display medium 104 and decoded.
- Information to provide a themed interaction. For example, this information may request that the ARFN 106 provide menus and other content with a particular color, audio, video, etc. To illustrate, the ARFN 106 may output content in a manner that is customized for a particular gender, movie, popular cartoon, artist, and so on.
- Other information, such as information identifying a user that acquired the display medium 104, information identifying one or more users that are associated with the display medium (e.g., registered users), information indicating a location of markers on the display medium 104, and/or information identifying where the display medium 104 or another display medium can be acquired. Further, in one example the information indicates content restrictions for one or more types of content. For instance, the information may indicate that the display medium 104 may only be used to consume content with a particular rating (e.g., "family" content).

The projection module 126 may manipulate the projected content so that it appears correctly on the display medium 104. For example, the projection module 126 may vary the size, location, orientation, and/or aspect ratio of the projected image. The projection module 126 may also use techniques such as keystone correction to correct the appearance of the projected image in situations where the projection source is not aligned with the display medium 104. For example, the projected image may be intentionally distorted to account for a non-perpendicular alignment of the display medium with respect to the projection source. In some situations, the projected image may also be distorted to correct for irregularities or non-planar characteristics of the display medium 104. Further, in some instances the projection module 126 may utilize information about a location/pattern of one or more markers on the display medium 104 and/or information (e.g., characteristic information) from the one or more markers to project content, adjust parameters/setting of the ARFN 106, track the display medium 104, perform keystone correction, and so on.

As noted above, the storage media 118 may also include other modules, which may be configured to implement various different functionality of the ARFN 106. For example, the storage media 118 may include one or more modules to utilize other information provided by a marker, such as information for authenticating a user, information for accessing particular content, and so on.

Example ARFN

Figure 2:
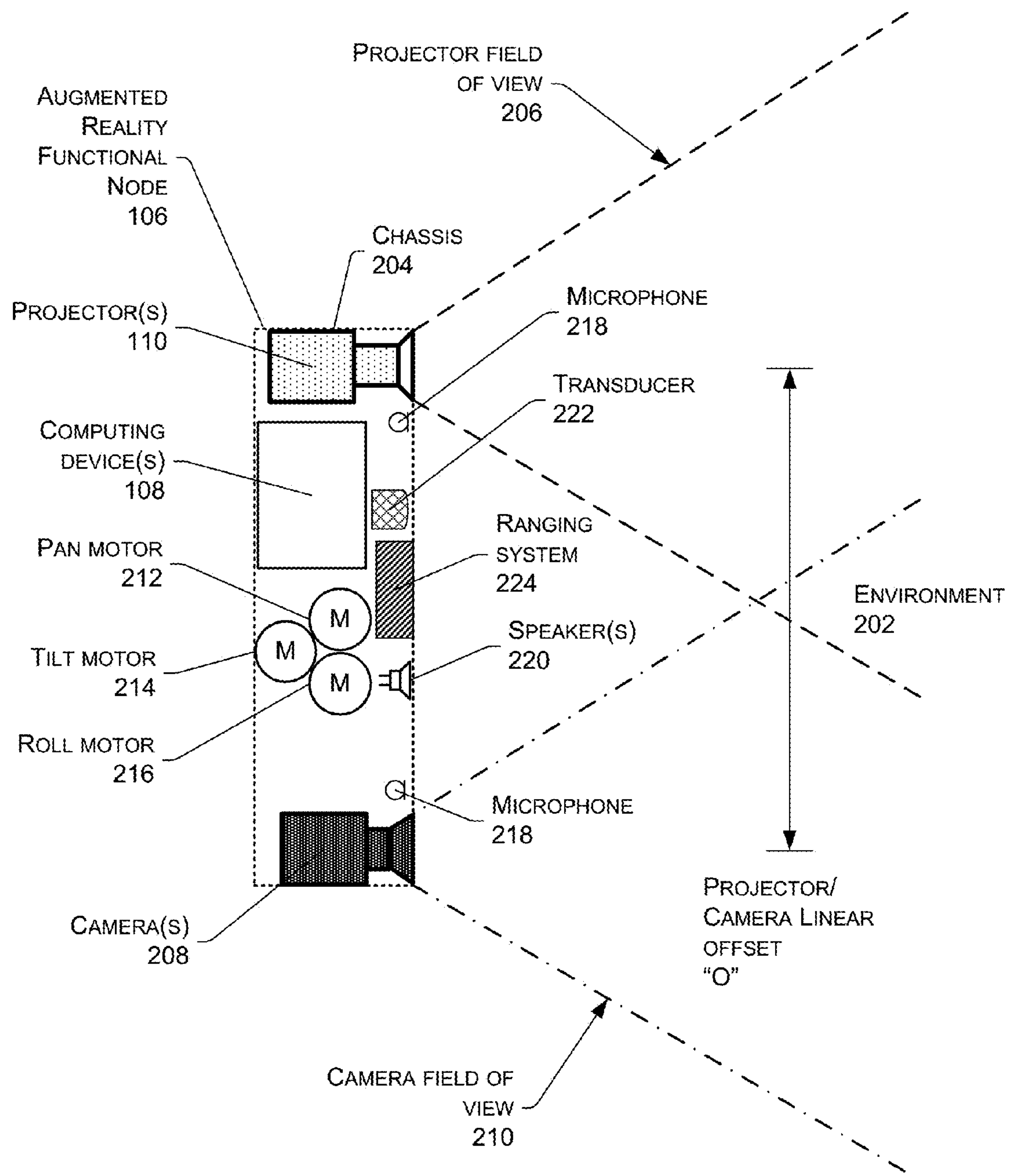
FIG. 2 shows additional details of the example ARFN of FIG. 1.

FIG. 2 shows additional details of the example ARFN 106 of FIG. 1. The ARFN node 106 is configured to scan at least a portion of an environment 202 and the objects therein to detect a display medium. The ARFN node 106 may also be configured to provide augmented reality output, such as images, sounds, and so forth.

A chassis 204 holds the components of the ARFN node 106. The projector(s) 110 may be disposed within the chassis 204 and may be configured to generate and project light and/or images into the environment 202. These images may be visible light images perceptible to a user, visible light images imperceptible to the user, images with non-visible light, or a combination thereof. This projector(s) 110 may be implemented with any number of technologies capable of generating an image and projecting that image onto a surface within the environment 202. Suitable technologies include a digital micromirror device (DMD), liquid crystal on silicon display (LCOS), liquid crystal display, 3LCD, and so forth. The projector(s) 110 has a projector field of view 206 which describes a particular solid angle. The projector field of view 206 may vary according to changes in the configuration of the projector(s) 110. For example, the projector field of view 206 may narrow upon application of an optical zoom to the projector(s) 110.

A camera(s) 208 may also be disposed within the chassis 204. The camera(s) 208 is configured to image the environment 202 in visible light wavelengths, non-visible light wavelengths, or both. The camera(s) 208 has a camera field of view 210 that describes a particular solid angle. The camera field of view 210 may vary according to changes in the configuration of the camera(s) 208. For example, an optical zoom of the camera(s) 208 may narrow the camera field of view 210.

In some implementations, a plurality of cameras 208 may be used. For instance, one embodiment of the ARFN node 106 may include a three-dimensional (3D), infrared (IR) camera and a red-green-blue (RGB) camera. The 3D, IR camera may be configured to capture information for detecting depths of objects within the environment 202, while the RGB camera may be configured to detect edges of objects by identifying changes in color within the environment 202. In some instances, a single camera may be configured to perform these functions.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector(s) 110 and/or the camera(s) 208. For example, in one implementation the actuator may comprise a pan motor 212, a tilt motor 214, and so forth. The pan motor 212 is configured to rotate the chassis 204 in a yawing motion. The tilt motor 214, meanwhile, is configured to change the pitch of the chassis 204. In some instances, the ARFN 106 additionally or alternatively includes a roll motor 216, which allows the chassis 204 to move in a rolling motion. By panning, tilting, and/or rolling the chassis 204, different views of the environment 202 may be acquired.

One or more microphones 218 may be disposed within the chassis 204, or elsewhere within the environment 202. The one or more microphones 218 may be used to acquire input from an entity (e.g., a user), for echolocation, location determination of a sound, or to otherwise aid in the characterization of and receipt of input from the environment 202. In some instances, a user may use voice commands to control various aspects of the ARFN node 106. A speaker(s) 220 may also be present to provide audible output, such as the output from a text-to-speech module or playback from pre-recorded audio.

A transducer 222 may be present within the ARFN node 106, or elsewhere within the environment 202, and may be configured to detect and/or generate inaudible signals, such as infrasound or ultrasound. These inaudible signals may be used to provide for signaling between accessory devices and the ARFN node 106.

The ARFN node 106 may also include a ranging system 224. The ranging system 224 is configured to provide distance information from the ARFN node 106 to a scanned entity, object (e.g., display medium), or set of objects. The ranging system 224 may comprise and/or use radar, light detection and ranging (LIDAR), ultrasonic ranging, stereoscopic ranging, structured light analysis, time-of-flight observations (e.g., measuring time-of-flight round trip for pixels sensed at a camera), and so forth. In structured light analysis a projector may project a structured light pattern onto the scene within the environment 100, and a camera may capture an image of the reflected light pattern. Deformation in the reflected pattern, due to a lateral displacement between the projector and the camera, may be analyzed by the ARFN 106 to determine depths or distances corresponding to different points, areas, or pixels within the environment 100. In some implementations the transducer 222, the microphones 218, the speaker(s) 220, or a combination thereof may be configured to use echolocation or echo-ranging to determine distance and spatial characteristics of an entity or object.

In this illustration, the computing device(s) 108 is shown within the chassis 204. However, in other implementations all or a portion of the computing device(s) 108 may be disposed in another location and coupled to the ARFN node 106. This coupling may occur via wire, fiber optic cable, wirelessly, or a combination thereof. Furthermore, additional resources external to the ARFN node 106 may be accessed, such as resources in another ARFN node 106 accessible via a local area network, cloud resources accessible via a wide area network connection, or a combination thereof.

Also shown in this illustration is a projector/camera linear offset designated "O". This is a linear distance between the projector(s) 110 and the camera(s) 208. Placement of the projector(s) 110 and the camera(s) 208 at distance "O" from one another may aid in the recovery of structured or other light data from the environment. The known projector/camera linear offset "O" may also be used to calculate distances, dimensioning, and otherwise aid in the characterization of entities or objects within the environment 202. In other implementations the relative angle and size of the projector field of view 206 and camera field of view 210 may vary. Also, the angle of the projector(s) 110 and the camera(s) 208 relative to the chassis 204 may vary.

In other implementations, the components of the ARFN node 106 may be distributed in one or more locations within the environment 100. As mentioned above, the microphones 218 and the speaker(s) 220 may be distributed throughout the environment. The projector(s) 110 and the camera(s) 208 may also be located in separate chasses 204. The ARFN node 106 may also include discrete portable signaling devices used by entities to issue command attention inputs. For example, these may be acoustic clickers (audible or ultrasonic), electronic signaling devices such as infrared emitters, radio transmitters, and so forth.

The ARFN node 106 is shown in FIG. 2 with various sensors, but other sensors may be located either within or external to the chassis 204. The sensors may include, in various embodiments, cameras (motion and/or still cameras), audio sensors such as microphones, ultrasound transducers, heat sensors, motion detectors (including infrared imaging devices), depth sensing cameras, weight sensors, touch sensors, tactile output devices, olfactory sensors, temperature sensors, humidity sensors, pressure sensors, and so forth.

Example Display Media

Figure 3A:
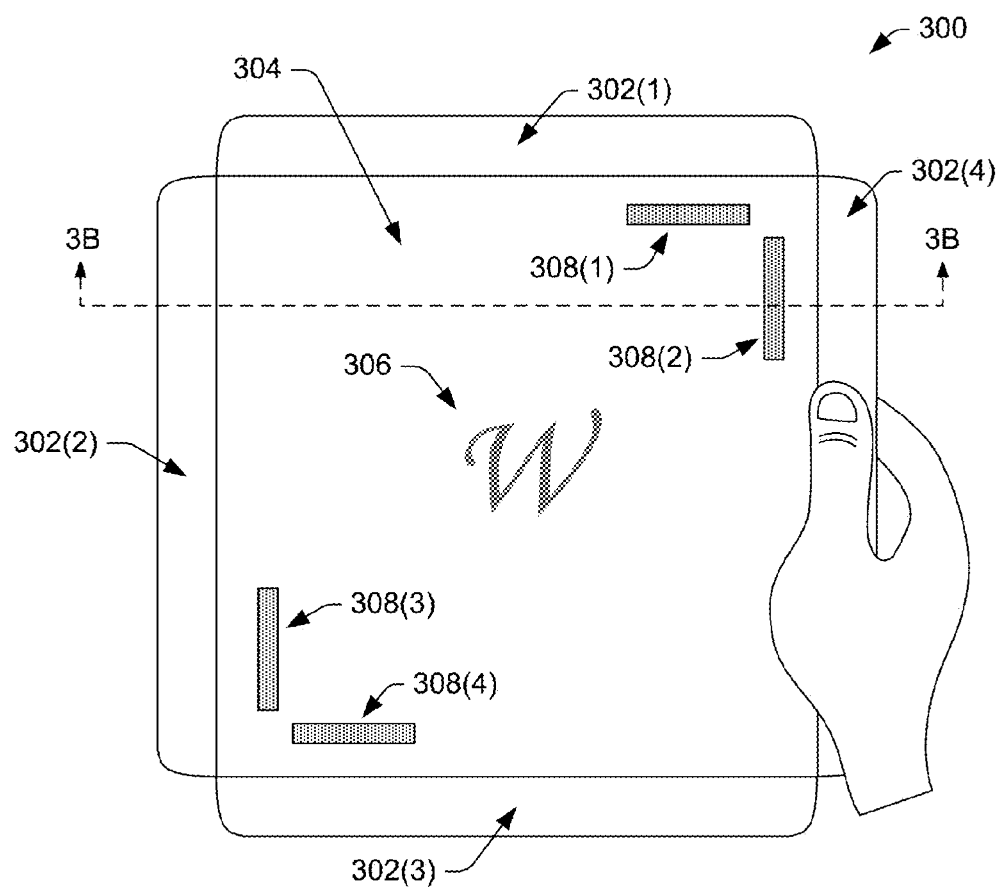
FIGS. 3A-3B illustrate an example display medium having a substantially polygonal shape.
Figure 3B:
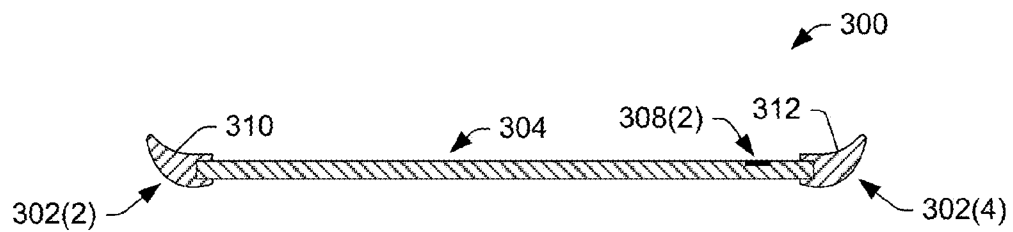

FIGS. 3A-3B illustrates an example display medium 300 having a substantially polygonal shape (e.g., square) and handles 302. As illustrated in FIG. 3A, the display medium 300 includes the handles 302(1)-(4) attached to a body 304 of the display medium 300. The handles 302 may provide a location for a user to hold the display medium 300. In particular, the handles 302 may be adapted to a shape of a hand of a user. The body 304 may include a substantially planar surface and may be configured to receive projected content from the ARFN 106.

In the example display medium 300 of FIG. 3A, the body 304 includes an image 306 and infrared reflectors 308(1)-(4). The image 306 and infrared reflectors 308 may be visible or invisible to a user. The image 306 may include information (e.g., a digital watermark) that is embedded through digital watermarking techniques. For illustrative purposes, the image 306 and infrared reflectors 308 are illustrated as visible elements, however, in many instances the image 306 and infrared reflectors 308 are imperceptible to a user. Further, although the image 306 is illustrated with a "W" and the infrared reflectors 308 are illustrated with rectangular blocks, the image 306 and infrared reflectors 308 may include other images and/or patterns, at least some of which are unrecognizable by a user.

As noted above, the image 306 may include embedded information. In the example of FIG. 3A, the embedded information may indicate that the display medium 300 (e.g., body 304) is square shaped and/or that the infrared reflectors 308 are positioned within a particular proximity to corners of the display medium 300. This information may be used by the ARFN 106 to project content onto the display medium 300 and/or track the display medium 300.

Meanwhile, the infrared reflectors 308 are positioned in a particular pattern and at a particular location on the display medium 300. The infrared reflector 308(1) is positioned in a horizontal direction close to the top edge of the body 304, while the infrared reflector 308(2) is positioned in a vertical direction close to the right edge of the body 304. This pattern and position may indicate the location of the top right corner of the display medium 300, in particular the corner of the body 304. For example, the ARFN 106 may know that reflectors associated with square-shaped display media, include reflectors that are positioned at a particular distance from an edge of the display media. By determining a location of corners of the display medium 300, the ARFN 106 may accurately project content onto the display medium 300 and/or track the display medium 300.

FIG. 3B illustrates a cross-sectional view of the display medium 300 taken from the line labeled "3B" in FIG. 3A. In FIG. 3B, the handles 302(2) and 302(4) may be representative of the handles 302(1) and 302(3). Here, a right edge of the body 304 extends into the handle 302(4) to attach to the handle 302(4) and a left edge of the body 304 extends into the handle 302(2) to attach to the handle 302(2). The handles 302(2) and 302(4), as well as the handles 302(1) and 302(3), may be attached to the body 304 through any means, such as snaps, glue, clips, grooves, fasteners (e.g., screws, nails, etc.), and so on. Although the handles 302(2) and 302(4) are shown as being removably attached to the body of the display medium 300 in FIG. 3B, in some instances the handles 302(2) and 302(4), as well as the handles 302(1) and 302(3), are integral with the display medium 300. As such, the handles 302 may form edges of the display medium 300.

The handle 302(2) may include a surface 310 that is substantially concaved (e.g., upturned), and the handle 302(4) may similarly include a surface 312 that is substantially concaved. The surfaces 310 and 312 may be formed to a shape of a user's hand, such as a thumb of the user, enabling the display medium 300 to be held comfortably by the user. Further, in some instances the handles 302(2) and 302(4), as well as the handles 302(1) and 302(3), may include a different material, texture, and/or coating than the body 304.

As also illustrated in FIG. 3B, the infrared reflector 308(2) may be embedded into the body 304. In some instances, the infrared reflector 308(2), as well as the other infrared reflectors 308(1), 308(3), and 308(4), may be placed during fabrication of the display medium 300. However, in some instances the infrared reflectors 308 may be disposed on the surface of the body 304.

Figure 4:
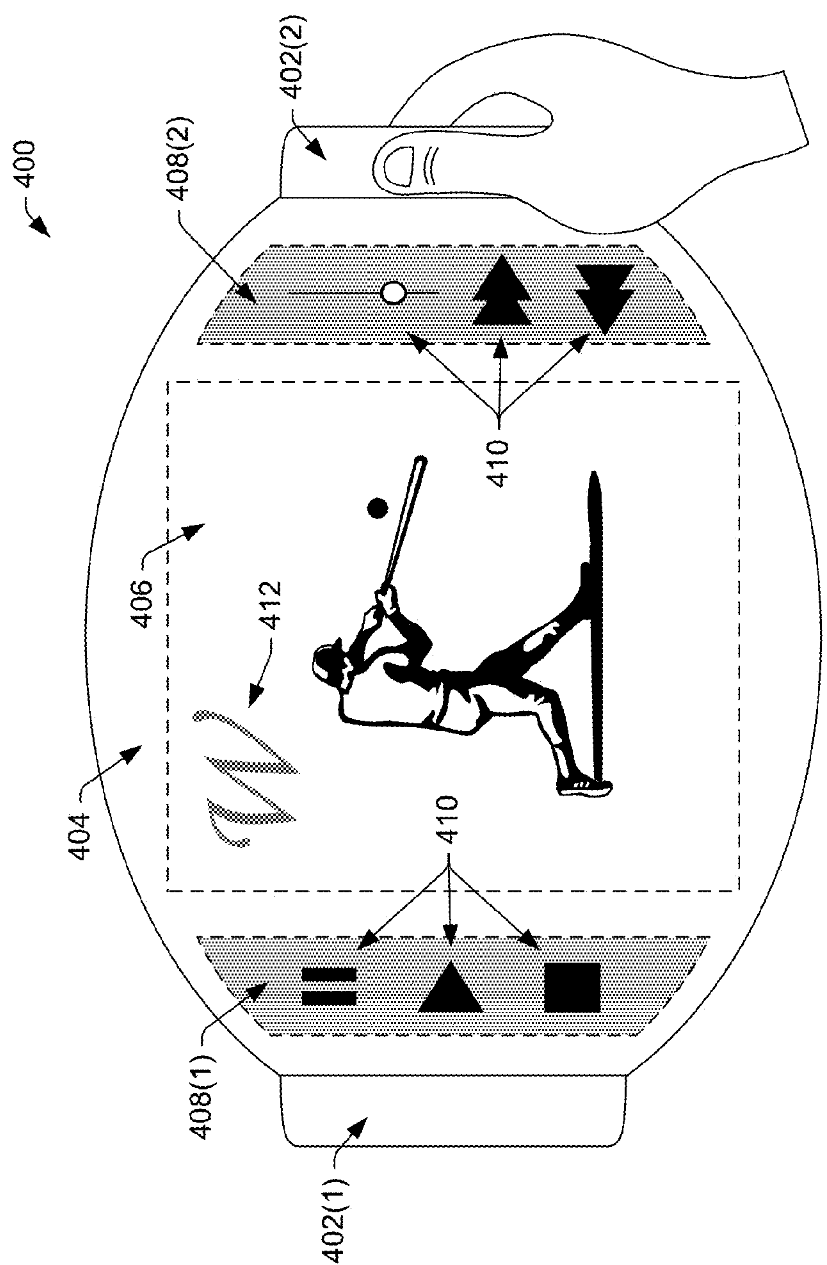
FIG. 4 illustrates and example display medium having a substantially elliptical shape and configured to receive different types of content.

FIG. 4 illustrates an example display medium 400 having a substantially elliptical shape. In some instances, the curved edges of an elliptical or circular display medium may provide more flexibility in projecting content onto the display medium in comparison to a square or rectangular display medium. That is, the projected content may not necessarily need to be projected as accurately onto an elliptical or circular display medium because the content does not need to be aligned to straight edges.

The display medium 400 includes handles 402(1) and 402(2) attached to a body 404. In some instances, each of the handles 402 includes a similar structure as that shown for the handles 302 of FIGS. 3A-3B, while in other instances the handles 402 may include a more planar cross section or other features.

The display medium 400 also includes display areas that may receive different types of content. In particular, the display medium 400 includes a main area 406 configured to receive non-control content (e.g., movies, textual content, or other media content) and side areas 408(1) and 408(2) configured to receive control content. In some examples, the main area 406 includes different structural characteristics than the side areas 408, such as different textures, materials, and/or coatings, which may be more optimal for a particular type of content. The control content may include interface elements 410, such as buttons, icons, sliders, and so on, that are projected on the side areas 408 and are selectable by a user. When, for example, one of the interface elements 410 is selected by the user through touch or other means, an action may be preformed, such as updating projected content.

In the example of FIG. 4, the display medium 400 includes an image 412 with embedded information. Here, the embedded information may indicate the size and/or location of the main area 406 and side areas 408. The embedded information may also include the baseball content (e.g., a baseball game or movie) that is being projected on the main area 406 and/or a link to the baseball content. Although the image 412 is illustrated as a visible element, the image 412 may be invisible to provide an unobstructed surface for content.

Figure 5A:
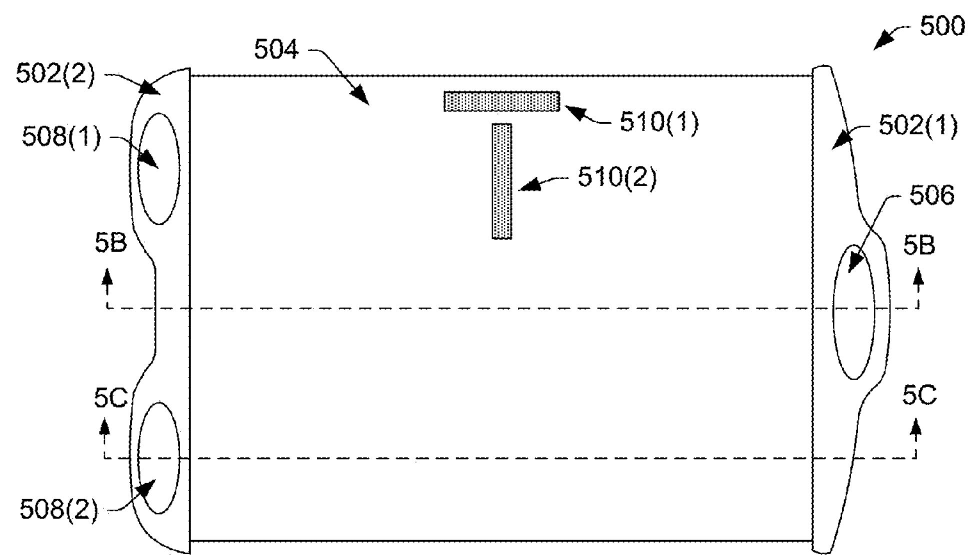
FIGS. 5A-5C illustrate an example display medium including form fitted handles.
Figure 5B:
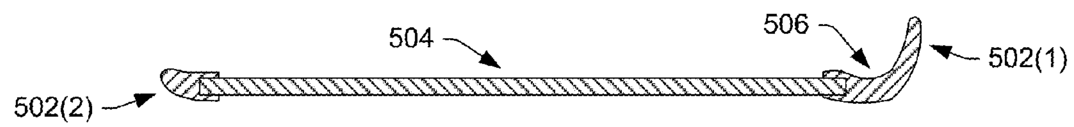
Figure 5C:
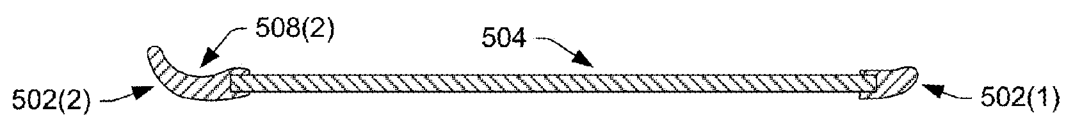

FIGS. 5A-5C illustrate an example display medium 500 including form fitted handles 502(1) and 502(2). FIG. 5A illustrates a front view of the display medium 500. The display medium 500 includes a body 504 to receive projected content and attach to the handles 502. The handle 502(1) include a concaved area 506 formed to a shape of a user's finger, such as a thumb of the user. Similarly, the handle 502(2) includes concaved areas 508(1) and 508(2) formed to a shape of the user's hand, such as a thumb. The areas 506, 508(1), and 508(2) may allow the user to comfortably hold the display medium 500 in a secured manner.

As illustrated in FIG. 5A, the display medium 500 includes infrared reflectors 510(1) and 510(2). The infrared reflectors 510 are positioned in a "T" shape to assist the ARFN 106 in determining a position and/or orientation of the display medium 500. For example, when the ARFN 106 identifies that the infrared markers 510 form an upright "T" shape, as illustrated in FIG. 5A, it may be determined that the display medium 500 is in a "landscape" viewing mode. Alternatively, when the ARFN 106 identifies that the "T" shape on its side, it may be determined that the display medium 500 is in a "portrait" viewing mode.

FIG. 5B illustrates a cross-sectional view of the display medium 500 taken from the line labeled "5B" in FIG. 5A. FIG. 5B illustrates that a portion of the handle 502(1) is curved upward to form the area 506. A user may grip the handle 502(1) such that the user's thumb is placed in the area 506 (e.g., between the upward portion of the handle 502(1) and the body 504). Meanwhile, FIG. 5B illustrates that the handle 502(2) includes a relatively planar profile.

FIG. 5C illustrates a cross-sectional view of the display medium 500 taken from the line labeled "5C" in FIG. 5A. FIG. 5C illustrates that the handles 502(1) includes a relatively planar profile and that the handle 502(2) includes a curved portion to form the area 508(2). The handle 502(2) profile of FIG. 5C may have less of a curve to it than the handle 502(1) profile of FIG. 5B. The different characteristics of the handles 502 may provide different means for hold the display medium 500, and allow a user to position the display medium differently.

Figure 6A:
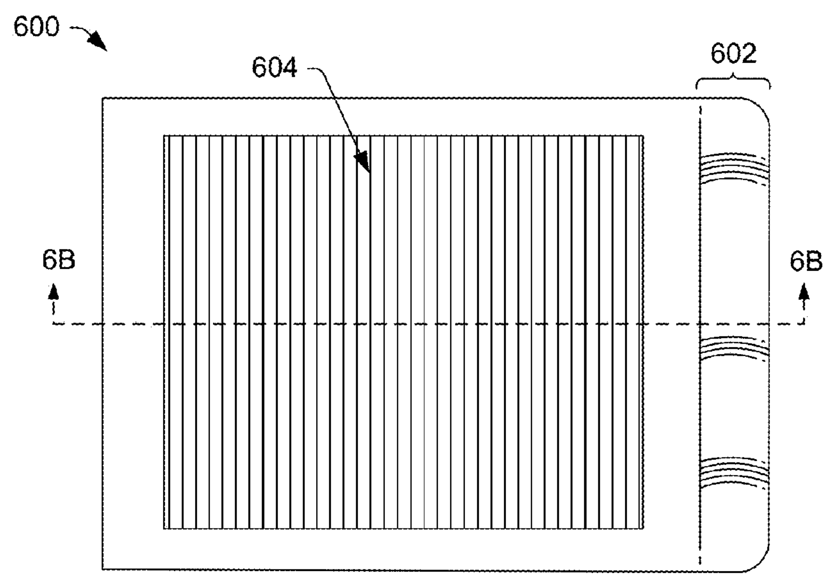
FIGS. 6A-6C illustrate an example display medium with a weighted end.
Figure 6B:
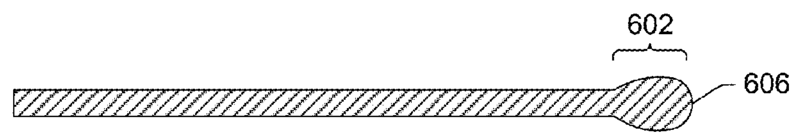
Figure 6C:
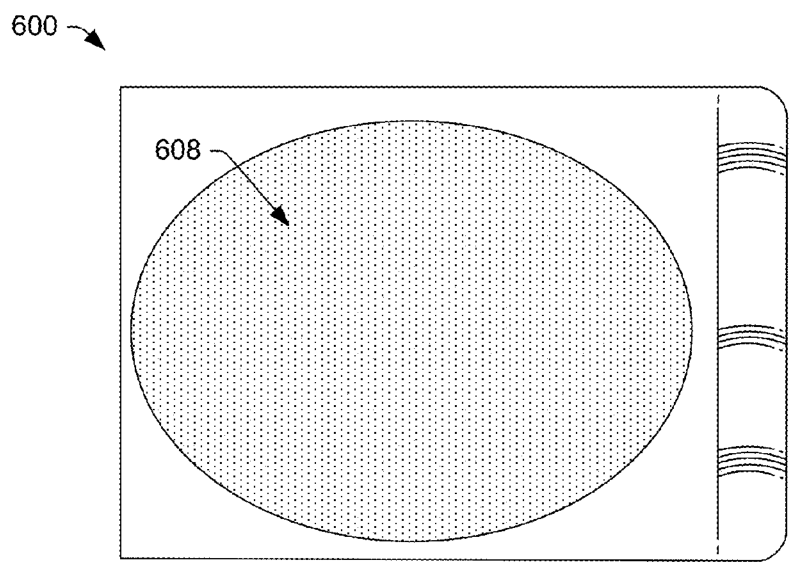

FIGS. 6A-6C illustrate an example display medium 600 with a weighted end 602. In particular, FIG. 6A shows a front side of the display medium 600. The weighted end 602 may form a bulbous shape on the right side of the display medium 600. Although illustrated with as bulbous shape, the weighted end 602 may include other shapes, such as a triangle, square, or another shape. In some instances, the weighted end 602 may fit into a user's hand comfortably and/or provide a feel that is similar to a book (e.g., similar to weighting of the spine of the book).

As also illustrated in FIG. 6A, the front side of the display medium 600 may include an area 604 to receive projected content. The area 604 may include particular structural characteristics, such as a particular shape or size, a particular texture or coating, a particular material, or a particular marker.

FIG. 6B illustrates a cross-sectional view of the display medium 600 taken from the line labeled "6B" in FIG. 6A. In particular, FIG. 6B shows that the cross section of the weighted end 602 includes a curved surface 606 to fit comfortably in a user's hand. Although illustrated as being curved, in some instances the surface 606 may be substantially planar allowing the display medium 600 to be placed in an upright position. As such the weighted end 602 may also form a stand for the display medium 600.

FIG. 6C shows a back side of the display medium 600. In particular, the back side includes an area 608 that has different characteristics than the front side (e.g., the area 604). For example, the area 608 may include a particular texture and/or coating that are optimal for receiving media content. As illustrated, the area 608 includes an elliptical shape. By having different characteristics on different sides of the display medium 600, a user may benefit from advantages associated with different types of materials, textures, coatings, and so on.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A handheld display medium comprising:

a body having:

a substantially elliptical or circular shape;

a display area configured to receive projected content;

one or more images displayed within the display area, the one or more images comprising at least one of a picture or text and having a watermark embedded therein, the watermark specifying information to at least one of identify a structural characteristic of the handheld display medium, identify the handheld display medium, authenticate a user, or provide access to particular content; and one or more markers, separate from the one or more images, to determine at least one of an orientation or a position of the handheld the display medium;

a handle integral with or attached to the body, the handle for facilitating grasping the handheld display medium by a user; and a stand integral with or attached to the body, the stand for supporting the handheld display medium when placed on a surface.

2. The handheld display medium of claim 1, wherein the handle is removably attached to an edge of the body.

3. The handheld display medium of claim 1, wherein the handle includes at least one upturned edge.

4. The handheld display medium of claim 1, wherein the display area includes interface elements for use with a system that projects the projected content.

5. The handheld display medium of claim 1, wherein the body includes a first side and a second side that have different structural characteristics, the structural characteristics comprising at least one of a shape or size, a texture or coating, or a material of which the body is made.

6. The handheld display medium of claim 1, wherein the information is at least to identify the structural characteristic of the handheld display medium, the structural characteristic of the handheld display medium comprising at least one of a shape of the handheld display medium, a size of the handheld display medium, a texture of the handheld display medium, a coating of the handheld display medium, or a material of the handheld display medium.

7. The handheld display medium of claim 1, wherein the one or more images are invisible to the user.

8. The handheld display medium of claim 1, wherein the one or more images are below a surface of the display medium and within the display area to receive the projected content.

9. A display medium comprising:
- a body having a substantially planar surface for displaying content projected thereon, the body including:
  - one or more markers to determine at least one of an orientation or a position of the display medium;
  - a display area to receive the projected content;
  - one or more images, separate from the one or more markers, arranged within the display area to receive projected content, the one or more images having a watermark embedded therein, the watermark comprising information related to the display medium, the information to at least one of identify a structural characteristic of the display medium, identify the display medium, authenticate a user, or provide access to particular content; and
  - a handle integral with or attached to the body.

10. The display medium of claim 9, wherein the one or more markers comprise one or more infrared reflectors.

11. The display medium of claim 10, wherein the one or more infrared reflectors are positioned in a predetermined pattern or at a predetermined location for determining one or more of the orientation or the position of the display medium.

12. The display medium of claim 9, wherein the body includes a first side and a second side having different characteristics for receiving projected content.

13. The display medium of claim 12, wherein the characteristics comprise at least one of a shape or size, a texture or coating, a material of which the body is made, or a marker.

14. A display medium comprising:
- a body having a substantially polygonal shape and at least one side that is weighted heavier than another side, the body being configured for displaying content projected thereon by a system;
- a display area configured to display the projected content;
- an image disposed on the body within the display area, the image comprising a watermark embedded therein to provide information to the system for projecting the content onto the body, the information to at least one of identify a structural characteristic of the display medium, identify the display medium, authenticate a user, or provide access particular content; and
- one or more markers, separate from the image, to determine at least one of an orientation or position of the display.

15. The display medium of claim 14, wherein the one or more markers comprise one or more infrared reflectors.

16. The display medium of claim 14, wherein the one or more markers are disposed at a predetermined location on the body to enable the system to identify at least one of the orientation or the position of the display medium.

17. The display medium of claim 14, wherein the body includes a first side and a second side that have different characteristics for receiving the content.

* * * * *